(12) United States Patent
Faine et al.

(10) Patent No.: US 7,491,372 B2
(45) Date of Patent: Feb. 17, 2009

(54) PROCEDURE TO LEACH COPPER CONCENTRATES, UNDER PRESSURE AND AT AMBIENT TEMPERATURE, BY FORMING A REACTIVE GEL IN A SULFATE-CHLORIDE MEDIUM

(75) Inventors: Jamie Rauld Faine, Santiago (CL); Freddy Aroca Alfaro, Santiago (CL); Raúl Montealegre Jullian, Santiago (CL); Abraham Backit Gutierrez, Santiago (CL)

(73) Assignee: Minera Michilla S.A., Santiago (CL)

( * ) Notice: Subject to any disclaimer, the term of this patent is extended or adjusted under 35 U.S.C. 154(b) by 753 days.

(21) Appl. No.: 11/018,614

(22) Filed: Dec. 21, 2004

(65) Prior Publication Data

US 2005/0169823 A1    Aug. 4, 2005

(30) Foreign Application Priority Data

Jan. 29, 2004    (CL) .................................. 143-2004

(51) Int. Cl.
*C22B 15/00* (2006.01)

(52) U.S. Cl. .............................. 423/26; 423/27; 423/28; 423/38; 423/39; 423/40; 423/41; 423/42; 423/45; 423/46; 423/47

(58) Field of Classification Search .................. 423/26, 423/27, 28, 38–41, 42, 45–47
See application file for complete search history.

(56) References Cited

U.S. PATENT DOCUMENTS

| 507,130 | A | 10/1893 | Hoepfner |
| 1,389,750 | A | 9/1921 | Gardiner |
| 1,745,945 | A * | 2/1930 | Mulock ........................ 75/432 |
| 3,711,332 | A | 1/1973 | Bastacky |
| 4,144,310 | A | 3/1979 | Frankiewicz et al. |
| 4,266,972 | A * | 5/1981 | Redondo-Abad et al. ... 205/607 |
| 5,114,806 | A | 5/1992 | Chiacchio et al. |
| 6,375,713 | B1 | 4/2002 | Edelstein |

FOREIGN PATENT DOCUMENTS

EP    1424403    6/2004

OTHER PUBLICATIONS

Haver, F.P. and Wong, M.M., "Recovering Elemental Sulfur From Nonferrous Minerals—Ferric Chloride Leaching of Chalcopyrite Concentrate," *Report of Investigations* 7474, United States Department of the Interior (1971).

Haver, F.P., et al., "Improvements in Ferric Cholide Leaching of Chalcopyrite Concentrate," *Report of Investigations* 8007, United States Department of the Interior (1975).

Huynh, L., et al., "The Rheological Properties of a Copper Concentrate Slurry: From Surface Chemistry to Pipeline Transport," Conference Rheofuture 2002, Karlsruhe (2002).

Johnson, D. Barrie, "Importance of Microbiology in the Development of Sustainable Technologies for Mineral Processing and Wastewater Treatment," http://biology.bangor.ac.uk/~bss014/documents/NESMI%2003.pdf, (Nov. 18, 2003).

Lin, H.K., "Characterization and Flotation of Sulfur from Chalcopyrite Concentrate Leaching Residue," *J. Minerals & Materials Characterization & Engineering*, vol. 2, No. 1, pp. 1-9 (2003).

Peacey, et al., "Copper Hydrometallurgy—Current Status, Preliminary Economics, Future Direction and Positioning Versus Smelting," Proceedings Copper 2003, Hydrometallurgy Session 1-3: Pressure Leaching I. Santiago de Chile (2003).

Ryan, M.P., et al., "Why Stainless Steel Corrodes," *Nature*, 415:770-774 (Feb. 14, 2002).

* cited by examiner

*Primary Examiner*—Steven Bos
(74) *Attorney, Agent, or Firm*—D. Peter Hochberg; Sean F. Mellino; Daniel J. Smola

(57) ABSTRACT

A chemical process to leach copper concentrates in the presence of a concentrated solution of sulfates and chlorides. The process includes forming a high reactivity chemical paste containing a high concentration of ions in the liquid phase of the paste which react with copper ores and forms a series of soluble salts. The salts are extracted by a simple wash. Mixing equipment for handling high viscosity liquids is used. The total mixing time is about 5 minutes, after which the paste is poured into a rectangular mold, of several hundred meters per side, and is left to settle and breathe. During settling, water and sulfuric acid are added at intervals to replace that consumed by the reactions taking place during the aeration, until the reactions have virtually end. This treatment results in a dry, very resistant mass, containing the copper extracted in form of chlorine salts, and sulfate.

18 Claims, 3 Drawing Sheets

PROCEDURE TO LEACH COPPER CONCENTRATES, UNDER PRESSURE AND AT AMBIENT TEMPERATURE, BY FORMING A REACTIVE GEL IN A SULFATE-CHLORIDE MEDIUM

BACKGROUND OF THE INVENTION

1. Field of the Invention

The present invention relates to a chemical procedure to leach concentrates, mainly copper concentrates, consisting of blending the concentrate and the reagents to form a paste having gel characteristics. The equipment for the process is not that traditionally used to leaching concentrates.

2. Description of the State of the Art

There is strong motivation to develop metallurgic processes to replace the traditional, well established copper smelting and conversion which involve the serious disadvantage of generating a significant amount of contaminants, whose treatment or disposition is highly expensive since the environmental regulations are increasingly stringent.

For this reason, both copper producing countries and those processing flotation concentrates to obtain pure copper are rapidly looking for processes to replace the existing ones. Because of the higher costs involved in the disposition of the wastes generated, the current processes could become nonfeasible, and current pyrometallurgical facilities could become obsolete.

The obvious alternatives which deserve worldwide attention are the processes following the aqueous approach to obtain the metal, which is denominated leaching. Originally, the aqueous approach, or hydrometallurgical processes, were not developed as an alternative to the pyrometallurgical processes. Their initial purpose was for treating the copper oxidized ores, which were not desirable for the smelting plants, due to their negligible amount of copper. On the other hand, there are hydrometallurgical industrial procedures both for treating low, and very low grade copper oxidized ores, and for copper sulfurated ores.

The interest in applying hydrometallurgical processes for treating copper concentrates begins in the sixties and the seventies of the 20th century. At the beginning of the seventies, the Bureau of Mines in the United States was the first one to try to develop a process to be industrially applicable for this purpose. Initially as an idea aimed at recovering the sulfur contents in the sulfides in a way different to the gaseous $SO_2$, as in the case of smelting. This process was based on a leaching in chloride media. On the other hand, leaching copper ores (and silver) in chloride media was originally patented at the end of 19th century in U.S. Pat. No. 507,130 (1893). The process patented at that occasion, provided some issues had been solved, could have perfectly been applied to the copper concentrate leaching. After 100 years of development, along which a large amount of time and resources have been consumed, and a huge amount of scientific devices and patents have been generated, some of them have reached the industrial application level for some time, and are still fully present, tested at pilot, or semi-commercial scale, and only sixteen in commercialization stage. All these processes are likely to be equally profitable under the specific circumstances in which they are applied, and none of them is thought to be a universal panacea. It is believed that most of them will be industrially applied in the future, depending on the peculiar conditions of the place where they will be used. The process according to the present invention is a new, alternative process that could be the most advantageous one if some specific requirements are met.

The currently effective processes as mentioned above can be first divided according to the anion prevailing in the leaching solutions, that is: (a) systems in sulfate media, (b) systems in chloride-sulfate media, and (c) systems in chloride media, or in a more general form: halide systems.

According to this classification, the processes using the bacterial leaching (which are two) would fall in the category of sulfate systems, at least for now, since the future probability using bacteria bearing high chlorine concentrations (such as the halo-tolerant bacteria, according to "Importance of Microbiology in the Development of Sustainable Technologies for Mineral Processing and Wastewater Treatment) and could have certain advantages over those currently known, has not been determined to be invalid.

Next, the processes currently effective can be performed either at high pressure and high temperature, or at ambient pressure and temperature. The high pressure and temperature processes, which also were developed from the 1970's and thereafter, are the most common ones. A further division may be applied if the processes include a subsequent grinding of the concentrates to take them to a size passing 20 to 25 μm, or if they are kept at the original grain size distribution of the concentration stage.

Finally, a last condition is whether the system does or does not use some additive to improve the leaching performance.

All these processes are characterized for being performed in an agitated reactor, specially manufactured for this operation, where the manufacturing material should be resistant to the existing conditions, in terms of pressure, temperature, and chemical activity. All these processes are also characterized for being performed in a liquid, aqueous media, that is, a particle suspension containing certain proportion of solids, that is, concentrates in process. The amount of solids in the blend with the aqueous solution is commonly given in terms of solid weight percentage or pulp density, and the typical values range from 5 and 30%. The highest value found for the processes described above is 67% in weight, as stated in U.S. Pat. No. 4,144,310; that is, a similar value to that used in the concentrates hydraulics transportation, or concentrate-ducts, with relatively high terrain slopes. In all the processes known, the solids concentrations are lower than 67%. The key characteristic of these systems is that each particle of the concentrate is isolated, and reacts individually during the leaching process.

Another important characteristic is that in all these processes, the final oxidant is the oxygen, which may be injected as air or pure oxygen into the aqueous mixture in the reactor, or by filling the atmosphere contained over the aqueous solutions, as in the case of the pressure reactors.

In general, even though the oxygen of the air is the final oxidizer, it is not that the oxygen is the reagent directly participating in the reactions. Generally, the oxidation reactions take place through an intermediate oxidant, working as an oxidation-reduction couple, where the last electron acceptor is the gaseous oxygen. These oxidation-reduction couples can be, for example: $Fe^{+3}/Fe^{+2}$, $Cu^{+2}/Cu^+$ and $NO_2/NO$.

This invention refers to an intrinsically chemical method, that is, non-biochemical, and in a sulfate-chloride ambient, and what is most innovative, that it is performed by means of equipment which is not typical to the copper concentrate leaching in reactors.

Unlike those above, the invention described below refers to a new process to leach concentrates, which is characterized by forming a paste between the concentrate and the reagents, a gel-like material having a high concentration of reagents provoking a reaction with sulfides, and that is left settling long enough for the dissolution reactions to be completed. This procedure does not require high pressures, or high temperatures, and obviously no type of bacteria. All the reactions take place naturally once the gel has formed, whose purpose is treating any kinds of copper concentrate, via hydrometallurgy, as shown below.

SUMMARY OF THE INVENTION

This invention is mainly aimed at providing a method to obtain pregnant copper solutions from concentrates of any type of copper sulfides, obviously including the chalcopyrite, suitable for being treated by the well known solvent extraction, and copper electro-winning method, for obtaining premium quality copper cathodes.

An object of this invention to obtain a leaching process able to get a minimum copper recovery of 96%, or at least comparable to a traditional copper smelter.

Another object of this invention is to provide a process having a very low investment in equipment, to compensate the longer time required to leach.

Yet another object of this invention is to execute the process of the present invention with a low sulfuric acid consumption.

Still yet another object to obtain a process applicable to the copper concentrate treatment with a wide range of grades and mineralogies.

Another object is getting most of the iron from the mineralogy species, such as the chalcopyrite, and in a lower proportion that from gangue, to remain on the final gravel as an insoluble form of precipitated iron species.

Yet another objection of the invention is to recover the sulfur, as released from the leaching reactions, in order to manufacture all or part of the sulfuric acid used by the process.

Still yet another object of the present invention is to recover precious metal, such as gold and silver, from the gravel.

Another object of the present invention is reducing operating costs to be lower than those of a smelter.

In summary, the industrial application process for the copper concentrate treatment by means of the procedure in this invention is composed of two consecutive, and complementary stages. First, the copper concentrate is blended with a series of reagents, as shown below, with a very small proportion of water, so that the resulting product is a mass having gel characteristics. In other words, it is a product similar to a solid, but showing flowing properties like a viscous liquid. Second, the material formed is placed in pools or tanks, such as those used in the solar evaporation processes, and left to rest or sit for an amount of time sufficient for the desired reactions to take place. Once the resting or settling time has elapsed, the mass contained in the pools, at that moment a very compact and tough solid, looking like a hardened concrete, is irrigated with a set of spraying nozzles, that is very small drop nozzles, and a slightly acidulated solution. This wash is aimed at dissolving the copper soluble salts formed during the resting time. The solubilized copper is carried by the irrigating solution, and the solution flow obtained at the exit of the washing stage is subject to a standard process to recover the metallic copper, preferably a solvent extraction stage, followed by electro-winning to obtain copper cathodes.

The solid, that remains after the wash is present in the pools as residue, is mainly composed of the sulfur from the leaching reactions of the copper sulfides, an iron precipitate (to be described later), a portion of the non-reacting sulfides, the portion of gangue that has not suffered reactions, and gold and silver in the concentrates originally containing these elements.

If it is preferred, this residue can be discarded to the ambient, into an adequate dump, and could be used for a future treatment. However, following a procedure suitable for recovering the valuable species still contained is advisable. Since this residue is strong enough to permit a new wash, it still can be irrigated by means of a dissolving liquid, to trap the sulfur, such as the ammonium disulfide, or the tetrachloroethylene (perchloroethylene), the latter being known in dry cleaning shops.

These are the sulfur solvents known so far, having less environmental and health risks, unlike the carbon disulfide, the carbon tetrachloride, and the benzene, which are increasingly rejected by the market due to their environmental problems. In this irrigation, nozzles similar to those used in the wash stage still can be used.

After the wash with the sulfur solvent, the final residue can contain precious metals, mainly gold and silver, which can be treated separately through the techniques already known.

DETAILED DESCRIPTION OF THE INVENTION

Figure 1:
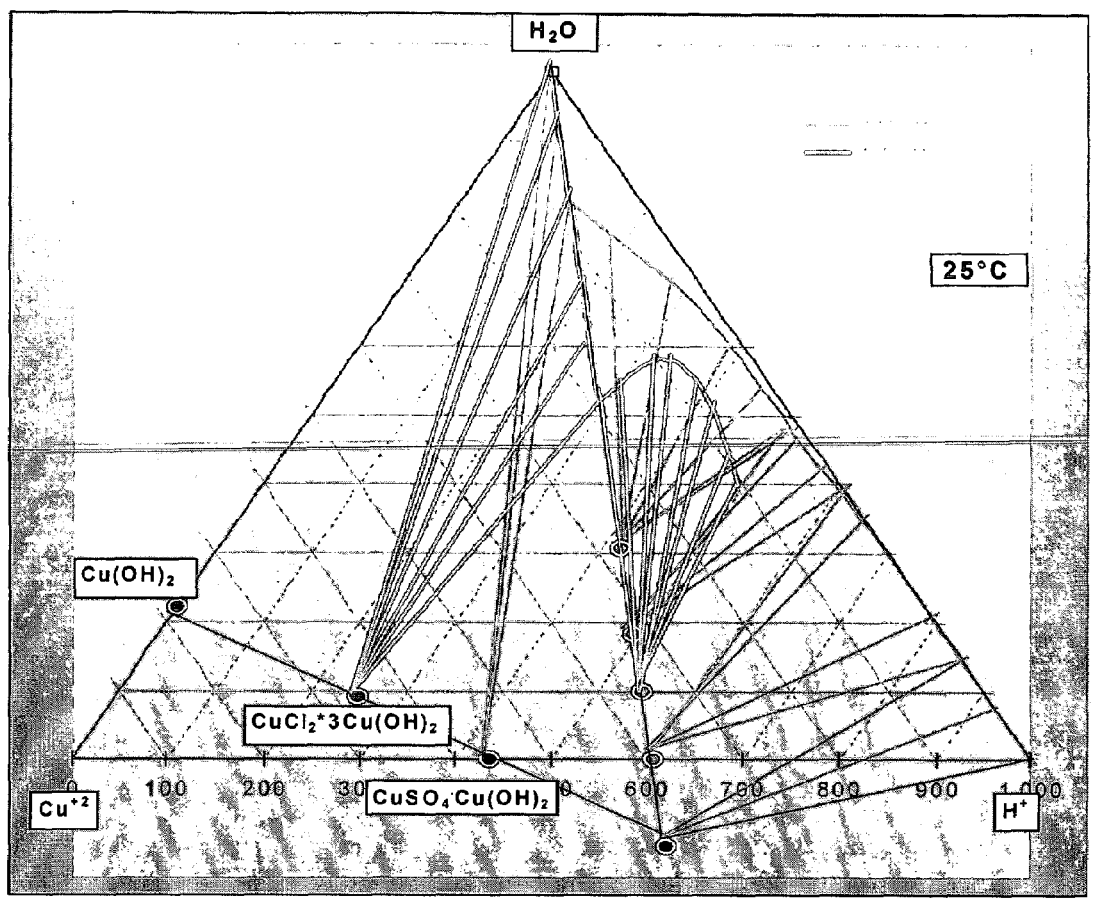
FIG. 1 is a graph showing the potential reactions taking place in the formation of oxysalts.

The stages required to leach the copper concentrates are described below.

The basic idea in the process of the present invention which makes it entirely new and different from the processes already known, includes forming a colloidal mass between the concentrate and the reagents, rather than making the concentrate particles react in an aqueous solution, of certain characteristics.

The original idea leading to the current concept is described below. Before that, however, it is necessary to state that the authors of this application are also inventors of two previous inventions: the Chilean Patent No 40.891, and the Patent Application No 2.694-2002 (U.S. application Ser. No. 10/715,914), the disclosures of which are incorporated by reference herein.

Both inventions refer to procedures to leach copper sulfide ores, and the blending of ores and concentrates, respectively. In both cases, the idea is putting the ore solid particles in contact with a small volume of reagent solution, through an operation denominated agglomeration and curing. The peculiarity of this operation, specifically, in that related to this invention, is the very high density of solids; in other words, the very low moisture with which it is executed. For example, in a typical operation, the amount of water used results in a 7% moisture, as measured on a dry base. In terms of solids weight percentage, which is the normal way of measuring this property in concentrate dispersions, this value transforms into 93% in weight, that is, solids weight to total weight. This amount is much higher than the typical values as used in a leaching process in reactors that, as we have seen, are about 5 to 30%.

Now, according to the two previous inventions, the reaction taking place in the agglomeration and curing stage, specially for the sulfurated species, are extremely efficient and quick, and one of the reasons for this to happen is the high density of solids. The other reason is that, given the small volume of water used, a given amount of reagent to be used shows itself in a high concentration of the reagents. For example, if 30 kilograms of sulfuric acid per ton of ore, and 70 liters of water per ton of ore are used, an acid concentration is obtained in the "aqueous solution" of 415 grams of acid per liter of water, approximately, which is a very high value for the normal concentrate leaching processes. Likewise, if 15 kilograms of calcium chloride per ton of ore, and 70 liter of water per tone of ore are used, a chlorine concentration of 137 grams per liter of water is obtained in the curing solution, which is also a very high value.

Initially, the inventors tried to reproduce a solution with these and higher concentrations of these and other reagents, to directly apply them to the copper concentrates. However, the result as obtained was not an aqueous solution, like in the traditional leaching processes, but rather a thick mass that had a behavior or consistency similar to that of a gel, a mayonnaise, a mousse, or a sauce, etc.

The original nature of this state of the matter includes a solid dispersed in "mechanical equilibrium" with a liquid phase, that is, a sol. In it, unlike the concentrate suspensions, the solid phase does not decant in a time experimentally measurable.

This colloid is formed by all the liquid reagents, including the water, forming the continuous phase, which is saturated with a dispersed solid phase, obtained by precipitation in its interior, when the original liquid components react. The main solid within the phase is calcium sulfate, obtained by reaction between the sulfate ion, contributed by the acid, with the calcium from the calcium chloride. This colloid, where the precipitate particles are of submicroscopic dimensions, that is, are not seen at naked eye, is called "reactive gel" given the high concentration of reactive elements forming it.

On the other hand, this colloid has thixotropic characteristics, and when a portion of a particulate solids such as a concentrate is added, it keeps the solid particles of the concentrate in suspension for an unlimited time, without mechanical agitation. It does not behave as in leaching with traditional agitation, where the concentrate decants if energy is cut out.

Consequently, the reactive solution intended for use in a leaching process involving traditional agitation did not have characteristics suitable for that, and the following step was blending the same reagents, this time along with the concentrate particles in a high concentration like that described above, thus obtaining a colloidal suspension. That is, concentrate particles kept at the bulk of the reactive gel.

In this state, the colloidal suspension's continuous phase is, in turn, a gel—the reactive gel—capable of bearing other particles into the substance, that is, the concentrate particles corresponding to the dispersed phase. In this case, particles are lyophilic, which is the reason why the mass obtained is mechanically stable. Particles are lyophilic since they can be charged, thus generating the electro-chemical double layer effect keeping them separated. Also, the reactive gel determines the physical properties of the colloidal suspension. Therefore, this material continues to show thixotropic properties. This is very important from a practical point of view, since the mass obtained can be easily handled, for example, by pumping it, or pouring it into a mold through an inclined surface.

In addition to the reactive gel and the concentrate particles, the colloidal suspension contains air bubbles, sometimes visible at the naked eye, formed during the blending of the gelatinous mass. The reactive gel has all the elements necessary to dissolve the sulfides, except oxygen, since the amount required is far higher than the one contained in the air bubbles.

Now, the mass should take oxygen from the air to complete the sulfide dissolving reactions. This is the purpose of the resting or settling stage. This condition requires that mass to be initially very porous, for oxygen to diffuse easily.

The oxygen as required by the reactions diffuses through the porous, and other mass imperfections. In another industrial application, a similar phenomenon takes place, supporting this explanation as described in U.S. Pat. Nos. 1,389,750; 3,711,332 and 5,114,806. They are the so-called gel battery. In principle, these batteries are like lead batteries used in cars, except that in these battereies the sulfuric acid solution corresponding to the liquid electrolyte typical to the lead batteries is replaced with a colloidal mass obtained by blending the sulfuric acid with some very fine particles known as silica fume, plus some thixotropic agents such as the sodium silicate. The material obtained is a gel having the peculiarity that the sulfuric acid gets trapped within the battery. This gel is injected into the electrolyte compartment, and works the same as the solid electrolyte. However, the interesting point for this analysis is the following: pure water should always be added to a traditional battery since it is consumed in the electrode reactions. Mainly during the battery charge stage, the anode produces oxygen from the water, which is released to the atmosphere. This water that is consumed should be replaced in the system, which is a usual practice. This would not be possible in a gel battery, because the gel has the consistency of a solid, and does not have the capability to absorb water, among other problems. Then, what happens in a gel battery is a very interesting phenomenon. The oxygen produced in the anode during the charge stage diffuses to the cathode where it reacts with the cathode active material, and through a series of reactions, finally recombines with the hydrogen formed by the cathode to replace the water lost. This way, there is no need to ever replace it. In this process, it is key that the gel has the capability of allowing the oxygen to diffuse. According to the theorists of this technological field, diffusion is possible due to the formation of micro pores on the gel, produced by the electrical current.

The phenomenon of the oxygen diffusing through the gel until reaching the reactive places is that pursued in this case. In this case, however, the phenomenon is totally different, since now the chemical reactions with the oxygen occur within the colloidal mass. For the overall phenomenon to be effective, that is, the oxidant to reach the surface of the concentrate particles, the distance among them should be short.

All that mentioned above corresponds to the initial state of the colloidal mass, that is, upon forming. However, once the concentrate dissolution reactions begin, the physical characteristics of the mass deeply change. After some days of settling, the mass gets hard, and its appearance corresponds to a mixture of cement hardened with sand. The reactive gel's chemical composition changes as reactions take place, while the concentrate mineral particles disappear. At the same time, a series of solid salts begins precipitating, probably acting as cementing phases. However, like the many aspects so far unknown in the theory of cement hardening, in this case the hardening phenomenon of the colloidal mass that was initially gelatinous is not fully known, either. What is of interest for this description is that the final mass is hard, permeable, and porous enough to resist the irrigation with an aqueous solution.

The reagents forming the initial colloidal mass are the following: Wet Concentrate, Sulfuric Acid, Calcium Chloride, Water, Sodium Chloride, Calcium Carbonate, and Other thixotropic elements.

The proportions in which these reagents are used depend on the concentrate involved.

The concentrate does not require drying, the filtering wetness is enough, which joins the initial water. In this stage, the sulfuric acid is used as concentrated technical acid, that is, with an approximate density of 1.83 g/l. The calcium chloride can be added as solids, with a concentration of 77% or 90-97% in weight, values at which this product is commercialized, or in a liquid solution with variable concentrations, as shown below. Water can be added pure, or in the calcium chloride solution. In both cases, the use of sea water may also be used as it already contains some proportion of sodium chloride (and other cations). The sodium chloride is added in the form of industrial grade, solid salt, when required. The calcium carbonate is here, a thixotropic agent, used in form of powder limestone, like that likely to be obtained in cement manufacturers.

The procedure to prepare the colloidal mass is the following: since a type gel substance is prepared, certain agitating equipment may not be suitable for this purpose. The equipment should be capable of stirring a dense and thick mass such as those used in the food industry, or those used to prepare the cement grout, or even the cement. So far, two types of equipment have been used: a kneader to manufacture different types of mass, and a cement mixer, both of commercial dimensions. That is, these are examples of mixing equipment in the food and drug industries. In both cases, and in any other one, it is essential to protect the parts of the equipment in touch with the colloidal mass from the extremely corrosive conditions present. For this purpose, we have deemed useful to protect the equipment with a paste, named BELZONA®, manufactured with ceramic composites. This product is mentioned here only as an example, and obviously there may be other brands with similar performance.

Within the bowl, the concentrate is added first, along with the calcium chloride, the water if any, and the sodium chloride, when used. In this stage, a fraction of the calcium carbonate is added, typically a third of the total mass to be added. All is stirred until obtaining a blend, with all the components properly distributed. This aspect is critical to get the results expected, although there is not yet a reaction, except the potential dissolutions. Next, while this blend continues to be stirred, the concentrated sulfuric acid begins to be added. Reactions begin immediately, mainly the formation of calcium sulfate through the reaction of the sulfuric acid with the calcium chloride, and the calcium carbonate. Then the precipitate of calcium sulfate is integrated by dispersing it into the blend, and forming the reactive gel as detailed above. Calcium carbonate produces carbon dioxide when reacting with the acid, when escaping it helps increasing the porosity of the mass, and the carbonate calcium turns into calcium sulfate, which allows the thixotropic properties of the colloidal mass to be controlled. To this effect, other thixotropic compounds can be used, such as the calcium sulfate itself in the form of gypsum or other inert compounds like talc, silica, and other silicates.

Once all the sulfuric acid has been added, the colloidal mass is already formed and shows high viscosity, a reason why the mixing equipment should be of high torque type to be able to continue stirring. The mass temperature exceeds 90° C. and can reach a few degrees above 100° C. The remaining two thirds of calcium carbonate are gradually added while the sulfuric acid is added.

Since the oxygen amount as absorbed by the mass during this period is very short, not longer than 5 minutes depending on the speed at which the acid is fully added, for the reactions to be completed; it is necessary to let the mass settle for a much longer time, like in the heap leaching taking place in the two previous inventions already mentioned.

The material is poured into a mold thanks to its thixotropic characteristics. Said mold can be a laboratory column for study purposes, a box in the case of a pilot plant, or a pool as large as desired for industrial purposes. In all cases, polyethylene has shown to be adequate to put up physically and chemically with the colloidal mass.

In some cases, the formation of gel may require adding some amount of acid smaller than the stoichiometric one, a common practice; in these cases, the acid missing is added during the settling stage by means of injectors, which are very similar to the subsequent irrigation.

Once resting has ended and the mass has fully reacted, a wash with acidulated water is applied, and copper is recovered in the outgoing solution with a selectable concentration, since it depends on the irrigating flow used. Also, here it is also feasible to use recirculation techniques which were described in the previously cited patents.

Although the execution of the process described in this invention is independent from the chemical mechanism that can actually occur in the system, it is desirable to further clarify the concepts involved, physical-chemistry concepts explain the new phenomena that have come up in this finding, with the better vision of the inventors.

As already mentioned, the reactions themselves start at the moment when the acid is added. The first reaction taking place is the acid reaction with the calcium chloride, forming calcium sulfate or gypsum, which precipitates in form of colloidal particles, as discussed in "The Rheological Properties of a Copper Concentrate Slurry: From Surface Chemistry to Pipeline Transport".

The reaction produced in this process is the following:

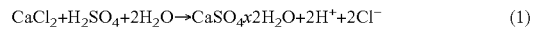

$$CaCl_2 + H_2SO_4 + 2H_2O \rightarrow CaSO_4 \cdot 2H_2O + 2H^+ + 2Cl^- \qquad (1)$$

The compound: $CaSO_4 \cdot 2H_2O$, which can also be semi-hydrated or dehydrated, is incorporated in the solution formed by the water and the rest of reagents. Since these particles are very fine and are in high proportion with respect to the liquid phase, a colloid is formed, which we have denominated reactive gel. This gel grows as more sulfuric acid is added. The chlorine ion in the reaction (1), like any other to be added separately, such as the NaCl is incorporated to the reactive gel. For example, a similar role would be played by the addition of magnesium chloride or other chloride, except that these compounds would not contribute sodium ions.

As clearly shown by reaction (1) the formation of calcium sulfate can be obtained from the addition of any sulfate, and not only as sulfuric acid. In fact, this reaction does not consume hydrogen ions. For example, the sodium sulfate would contribute both sulfate ions and sodium ions.

Initially, the reactive gel contains the following ions: $H^+$, $Cl^-$, $Na^+$, $Mg^{+2}$ and $SO_4^=$. As reactions take place, others are incorporated due to the acid attack, mainly the copper and iron ions, plus the impurities typical of the gangue, $Al^{+3}$, $Mn^{+2}$ and more $Mg^{+2}$.

Chemical Reactions Between the Reactive Gel and the Copper Concentrate

Next, the chemical reactions that are thought to occur in the process, both at the moment of preparation of the colloidal mass and the subsequent resting time, are described. These reactions are postulated according to a mass balance conducted for each of the elements involved, based on the identification of species carried out by X-Ray diffraction analysis. Mass balances are performed according to the species added to the process and the concentrations of the elements recovered at the end of it.

Reactions are written in a generic way rather global, the equations herein can represent only the beginning of a more complex mechanism.

For Copper Sulfurated Species

In the two inventions already mentioned, the ferric ion was established as the most likely oxidizer for the copper sulfides. According to this, the reactions for the most common sulfides would be written as follows:

a) $CuFeS_2 + 4Fe^{+3} \rightarrow Cu^{+2} + 2S^0 + 5Fe^{+2}$ (2)

b) $Cu_2S + 4Fe^{+3} \rightarrow 2Cu^{+2} + S^0 + 4Fe^{+2}$ (3)

c) $Cu_9S_5 + 18Fe^{+3} \rightarrow 9Cu^{+2} + 5S^0 + 18Fe^{+2}$ (4)

d) $CuS + 2Fe^{+3} \rightarrow Cu^{+2} + S^0 + 2Fe^{+2}$ (5)

e) $Cu_5FeS_4 + 12Fe^{+3} \rightarrow 5Cu^{+2} + 4S^0 + 13Fe^{+2}$ (6)

g) $Cu_3AsS_4 + 4H_2O + 11Fe^{+3} \rightarrow 3Cu^{+2} + 4S^0 + AsO_4^{-3} + 11Fe^{+2} + 8H^+$ (7)

In these reactions, sulfur can also oxidize to give $SO_4^=$.

For Iron Sulfurated Species $FeS + 2Fe^{+3} \rightarrow 3Fe^{+2} + S$ (8)

Copper Reaction from Oxides (for Example: Chrisocolla)

$CuSiO_3 + 2H^+ \rightarrow Cu^{+2} + H_2O + SiO_2$ (9)

Iron Reaction from Oxides (for Example: Hematite)

$Fe_2O_3 + 6H^+ \rightarrow 2Fe^{+3} + 3H_2O$ (10)

Reaction of Gangue Oxides $M_2O_x + 2xH^+ \rightarrow 2M^{+x} + xH_2O$ (11)

Where M is: Al, Mg, Mn, etc.

The reactions above correspond to potential leaching obtaining metals.

The ferric ion has been defined as the main oxidizer since, apparently, this is the real mechanism of the sulfide leaching.

In the case of this invention, the reactive gel as formed is even more concentrated in the chloride ion than in the case of the heap leaching. Therefore, its effect would be even stronger.

The chlorine effect over the sulfide leaching has been recently strengthened by recent research in the corrosion field. As a matter of fact, pitting corrosion on a stainless steel at a chloride environment, sea water for example, was an issue that was also in mystery. However, recent studies have revealed that this corrosion is originated in the chemical attack of small manganese sulfide inclusions, left by the steel manufacturing process. The proven originator is the chlorine ion, understood as acting through an electro-chemical mechanism. However, the detailed mechanism of the phenomenon has not been found yet. The full description of this phenomenon is expected to be discovered during the next few years, explanation that will also be valid for sulfide leaching in a chloride media, like in this case.

Ferric Ion Generation

After the leaching reactions, the most important mechanism in this system is the generation of the ferric ion. As widely explained in the two previous inventions, we have found a media to oxidize the ferrous ion without the need of bacteria, that is, by an exclusively chemical mechanism.

In the case of the current invention, a similar mechanism originates. What is new at this moment is that the most recent studies can be more specific regarding the complexes as formed between the copper and the chlorine, and between the iron and the chlorine. This is thanks to recent studies conducted in the field of evolucation of the species in aqueous systems. The mechanism originally discovered that we have called the "Cuprochlor Effect" can be described in the simplest way as follows:

Oxidation of the cuprous ion to cupric ion

Instantaneous setting of the equilibrium between the cupric and ferrous ions to give the ferric and cuprous ions.

Reaction of the ferric ion with the copper sulfides.

Generation of cupric ion by the first reaction, and of ferric ion by the second reaction, and so on.

This mechanism is autocatalytic, since it is closed by the reoxidation of the cuprous appearing in the second reaction, and the reoxidation of the ferrous, product of the sulfide leaching. The reaction continues steadily, until one of the reagents is over: the sulfuric acid or the oxygen.

The new knowledge refers to the species complexed for the copper and the iron existing under the real conditions of the reactive gel, that is, for a chlorine concentration between 100 and 200 g/l. Now, reactions can be written in a more specific way, as follows:

1.—For oxidation of the cuprous ion:

$2CuCl_3^{-2} + 2H^+ + \frac{1}{2}O_2 + 2Cl^- \rightarrow 2CuCl_4^{-2} + H_2O$ (12)

2.—For cupric/cuprous and ferric/ferrous equilibrium:

$CuCl_4^{-2} + FeCl_2(aqueous) \rightarrow CuCl_3^{-2} + FeCl_3(aqueous)$ (13)

3.—For chalcopyrite leaching (for example)

$CuFeS_2 + 4FeCl_3(aqueous) + 2Cl^- \rightarrow CuCl_4^{-2} + 5FeCl_2(aqueous) + SO$ (14)

The $CuCl_3^{-2}$ ion formed in the second reaction reoxides back in the first reaction, and the $FeCl_2(ac)$ ion formed in the third equation reoxides back in the second one, thus regenerating the ferric ion. Through this, the reaction becomes an autocatalytic reaction.

The only way for this reaction mechanism to stop is that one of the reagents of the global reaction is over, that is: $CuFeS_2$, $H^+$ or $O_2$. The goal, the final objective is the copper sulfide exhaustion. The acid added in the colloidal mass formation can get exhausted. For the reaction to continue, more acid should be added, which is done by adding a solution highly acidulated by means of aspersion. The oxygen enters the system through diffusion, for which the conditions for this to occur should be provided. That is, the mass should be considerably porous and permeable. If necessary, a method to solve this situation is injecting air or oxygen through the colloidal mass.

Copper Salt Precipitation

Due to the high amount of copper that can be recovered from the concentrates, and the small relative volume of liquid in the colloidal mass, copper precipitates will unavoidably form and account for most of the copper state in the colloidal mass when reactions are taking place. Also, since the system contains both $Cl^-$ and $SO_4^=$ as anions, it is normal that copper precipitates to appear in both systems, according to the precipitation conditions.

The potential reactions taking place in the formation of oxysalts are the following:

$2Cu^{+2} + SO_4^= + 2OH^- \rightarrow CuSO_4 \cdot xCu(OH)_2$ (15)

$4Cu^{+2} + 2Cl^- + 6OH^- \rightarrow CuCl_2 \cdot x3Cu(OH)_2$ (16)

Obviously, these reactions take place when the pH is high enough for a high concentration of $OH^-$ ions to be present, and the prevailing reaction will depend on the concentration of $SO_4^=$ and $Cl^-$ in the system.

Sulfur Oxidation

During the experiment, it has been found by stoichiometry calculations that part of sulfur, between 10 and 20%, that is a product of the dissolution reactions of the sulfides, oxidizes according to the reaction:

$$S°+H_2O+3/2O_2 \rightarrow SO_4^= +2H^+ \tag{17}$$

The remaining sulfur incorporates in the solid residue, and can be recovered by means of a solvent of flotation.

Ferric Precipitation

In all the research conducted, and this is one of the most interesting and relevant features, it has been found that the iron in the residue is in the form of sodium jarosite. This is one of the most important characteristics of the process, because it means that the iron leached from the chalcopyrite, bornite or other similar species, is not widely recovered in the solution along with the copper, but remains in the residue as an insoluble species.

Probably, the reaction taking place is the following:

$$3Fe^{+3}+6H_2O+2SO_4^=+Na^+ \rightarrow NaFe_3(SO_4)_2(OH)_6+6H^+ \tag{19}$$

This reaction is believed possible and very backed due to the presence of the high concentrations of sodium ion from the sea water and the NaCl salt.

In a smaller proportion, iron hydroxide has also been found as precipitated product, which would form according to the reaction:

$$Fe^{+3}+3H_2O \rightarrow Fe(OH)_3+3H^+ \tag{20}$$

and both reactions generate acid.

Obviously, the practical realization of the process described in this invention is independent from the chemical mechanism really taking place, and all the previous description represents the best vision of the authors for the sole purpose of physical-chemistry explaining these new phenomena.

Practically speaking, the industrial process as product of the reactions described above can be described as follows:

in a high torque mixing equipment, of the same type that those used in the food or cement industry, either in a continuous or batch process, the concentrate is mainly blended with water, calcium chloride and calcium carbonate, a homogeneous, liquid suspension is obtained. Next, a sulfuric acid flow is commenced to be added without splashing, while keeping the mixing movement. At that moment, the mass begins getting very thick and viscous and the operation continues for some minutes until all the acid required has been added. Then, the material is cast or pumped into a pond. In practice, there are cement continuous mixers fitted with a pump, so that this stage can be executed in a single step. All the equipment in contact with the colloidal blend should be coated to resist corrosion, such as BELZONA® composite already mentioned.

Figure 2:
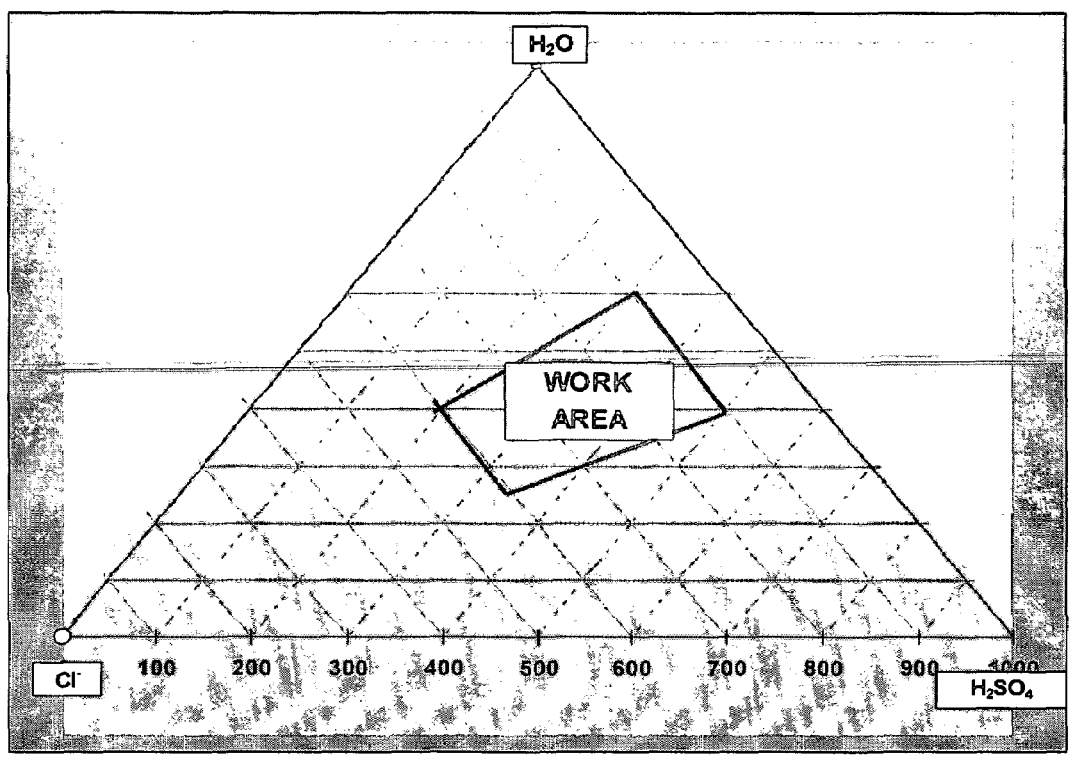
FIG. 2 is a graph showing the relative proportions of water, chlorine and sulfuric acid used in the process of the present invention.

The proportions of (1) total water, that is, the pure water as added, plus that contained in the calcium chloride solution, plus that contained in the concentrate as moisture; (2) total chlorine, that is, the chlorine as contained in the water, plus the chlorine contained in the calcium chloride, plus the chlorine contained in the sodium chloride, and (3) the sulfuric acid, should be such to be contained into a polygon of the ternary $H_2O$, $Cl^-$, $H^+$ system as shown in FIG. 2. This polygon will be framed by the following four apexes: (a) water: 60%, Chlorine: 10%, sulfuric acid 30%. (b) water: 40%, chlorine: 10%, sulfuric acid: 50%. (c) water 25%, chlorine 40%, sulfuric acid: 35% and (d) water: 40%, chlorine: 40%, sulfuric acid: 20%, where the percentages are in weight of the respective element.

The solution containing the calcium chloride is prepared from the commercial products, that is, pellets, dry flakes, or a liquid (typically 34% in weight) to prepare a liquid solution in concentrations of 22 to 250 grams of chlorine per liter of solution, and meeting the previous requirement.

The pool where the colloidal mass is deposited is, simply, a hole built in the same terrain, coated with a layer of 1 to 4 mm thick polyethylene, putting up with the corrosive and slightly heat material from the mixer. The size of the pools can be as large as necessary to obtain the required production. The material can be left settling directly under the sunlight, as is the common practice in the sun evaporation pools. However, a preferred method consists in placing over the reacting material a polycarbonate surface, the same as that used in greenhouses, "V" shaped and joined like in a roof. The construction details are independent from the objective of this invention. The use of this device has several advantages: first, by producing a greenhouse effect it keeps a temperature relatively constant, on the other hand, gases, if any, are kept stagnant for a potential subsequent handling, and finally, this roofing provides a fixed and stable structure to support the irrigation system and sprayers.

If necessary, from time to time as determined by the studies, water acidulated with sulfuric acid, typically of 200 g/l, is added by means of injectors, to replace the missing acid.

When estimating or measuring whether the material has completed the sulfide dissolution reactions, the final irrigation is started to dissolve when the copper soluble precipitates. Irrigation should be extremely rigorous to efficiently wash the mass and leave practically no copper inside it. Also during the wash stage, which can take days, the reactions described above continue, helping to a higher copper recovery. The irrigation extent, that is, the irrigation rate and time depend on the concentration of copper desired in the outgoing solution. The higher the irrigation flow, or the longer the time, the lesser the concentration. The simplest case includes immediately obtaining a solution suitable for a direct solvent extraction, that is, of 4 to 6 g/l of copper. However, this concentration can be significantly increased with lower irrigation rates, or by mean of a recirculation.

Once the wash has ended, including the final drainage, copper is recovered from the solutions by the usual particles, that is, normally by SX-EW. Nevertheless, the solutions obtained in this process are so unusually pure, that a more direct operation can be applied allowing to avoid the solvent extraction stage in order to reduce costs. For example, by means of a direct electro-winning stage, or other operations forming part of the conventional metallurgical resources currently known.

After the wash, the solid residue is mainly composed of sulfur, sodium jarosite, the remaining gangue, other minor iron species, and a small fraction of non-reacted sulfides. This residue can be subsequently treated to recover some valuable elements. It is especially interesting to recover sulfur to manufacture the sulfuric acid that can be used, partially, in the same process. A known method to do so is extracting the residue from the pool, subjecting it to a flotation stage, after diluting it in enough water. However, the preferred way to recover sulfur is by irrigating the previous residue by means of a solvent, for example, perchloroethylene. This operation has the advantage that it is not necessary to remove the material from the pond to continue processing it. The solvent solution containing sulfur is later evaporated to obtain crystallized sulfur, and the solvent is recovered by condensation to be reused.

Once the irrigation with solvent has ended, the residue is irrigated once again with a solution slightly acidulated, that in general will be different from that used at the beginning, for two purposes. One is to recover the solvent remaining in the residue that is soaking, taking advantage of the fact that the solvent and the water are nearly immiscible. The second is to recover more copper that could still be inside the bulk.

The final residue as obtained after the previous stages can be easily discarded since it has no elements dangerous for the environment, i.e., the arsenic will be in form of ferric arsenate due to the strongly oxidant conditions of the system. However, the residue still can contain some precious metals, especially gold and silver. If the amount present in it permits it, several known processes can be used to extract it, which are less aggressive to the environment than the cyanide; irrigated with thiourea, for example.

EXAMPLE

A large number of trials has been performed by using the concepts described above, both in small columns and larger containers, of approximately 200 kilograms of concentrate each. Next, an example summarizing the most significant results, at our judgement, obtained from these experimental tests.

At the bowl of a kneader with a rated capacity of 20 kilograms, were added 5 kilograms of a high copper grade concentrate with the following chemical and mineralogical characteristics (as shown in Table 1)

TABLE 1

CHEMICAL AND MINERALOGICAL CHARACTERISTICS OF THE CONCENTRATE USED

| CONCENTRATE CHARACTERIZATION | | 0149-1 Sep. 06, 2001 |
|---|---|---|
| Total Cu | [%] | 45.36 |
| Soluble Cu | [%] | 2.80 |
| Cu as Sulfide | [%] | 42.56 |
| Total Fe | [%] | 16.50 |
| Soluble Fe | [%] | 0.80 |
| Chalcopyrite | [%] | 60.82 |
| Chalcosite | [%] | 0.09 |
| Digenite | [%] | 28.29 |
| Coveline | [%] | 5.72 |
| Bornite | [%] | 2.36 |
| Gray Copper | [%] | 0.07 |
| Tenantite | [%] | 0.0 |
| Enargite | [%] | 0.02 |
| Cu content in Copper Sulfide Base | [%] | 48.56 |
| Molibdenite | [%] | 0.04 |
| Pirite | [%] | 2.60 |

These data show that nearly 40% of the copper content is in form of chalcopyrite.

The size distribution analysis of the concentrate is shown in TABLE 2.

TABLE 2

CONCENTRATE SIZE DISTRIBUTION ANALYSIS

| Mesh | Mass Partial % | Mass Accumulated % | % CuT [%] | % CuS [%] | % CuI [%] |
|---|---|---|---|---|---|
| 65# | 0.00 | 0.00 | | | |
| 100# | 1.18 | 1.18 | 36.06 | 2.80 | 33.26 |
| 200# | 15.14 | 16.32 | 40.15 | 1.80 | 38.35 |
| −200# | 83.68 | 100.0 | 46.91 | 1.60 | 45.31 |
| Total | 100.0 | | 45.76 | 1.64 | 44.12 |

This concentrate was blended with 800 g of sodium chloride, 1,350 ml of a calcium chloride solution of 620 g/l of $CaCl_2$, and 300 g of calcium carbonate. After thoroughly stirring this blend, concentrated sulfuric acid began being added, without stopping the agitation, until completing 420 ml. Once the acid addition was completed, the mass temperature reached 85° C., forming the colloidal mass. This mass, weighing around 9,000 g, was poured into a small column of 18 cm of diameter, and left settling. During the resting or settling period, and each 7 days, 500 ml of an acidulated solution was added with 200 g/l of sulfuric acid by means of a manual sprayer.

Figure 3:
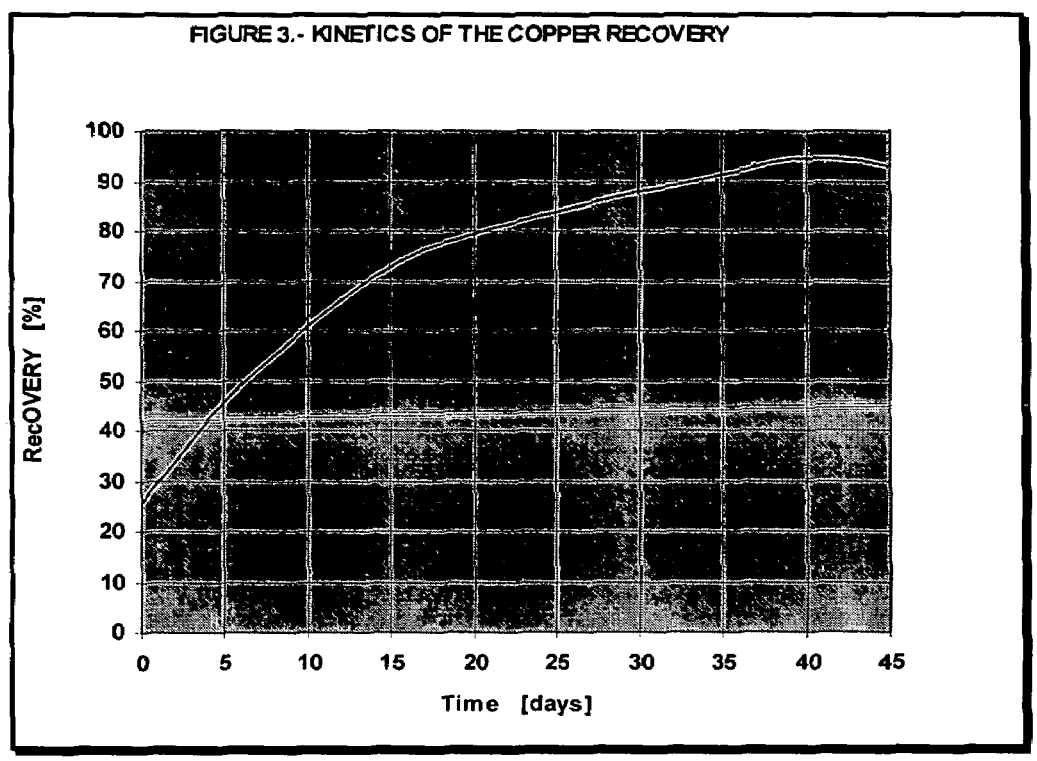
FIG. 3 is a graph showing the amount of copper recovered over time.

For each certain time interval, usually each 7 days, a small solid sample was collected for the purpose to track the kinetics of the reaction. FIG. 3 shows the results obtained. The final copper recovery was of 94.6%, which means that the copper recovery from the chalcopyrite was of 91.1%, approximately.

Once the settling ended, the whole mass was irrigated with a sea water acidulated solution with 8 g/l of sulfuric acid.

Table 3 shows the species present by x-ray diffraction, before and after the wash with sea water. As can be seen, the species contained are: Copper precipitated salts, non-reacted chalcopyrite, sodium natrojarosite, calcium sulfate, and sulfur. After the wash, the copper salts have nearly completely disappeared, and the rest of the species are unchanged.

TABLE 3

SPECIES PRESENT BEFORE AND AFTER THE WASH ANALYSIS VIA X-RAY DIFFRACTION (QUALITATIVE)

| Material before wash | Material Washed |
|---|---|
| $Cu_2(OH)_3Cl$ | $CuFeS_2$ |
| $Cu_2Cl(OH)_3$ | S |
| $CuFeS_2$ | $NaFe_3(SO_4)_2 \cdot (OH)_6$ |
| $NaFe_3(SO_4)_2 \cdot (OH)_6$ | $Cu_4SO_4(OH)_6$ |
| $CaSO_4$ | $CaSO_4$ |
| S | |
| $CuSO_4 \cdot 3H_2O$ | |

The analysis of the solution obtained after the wash is shown in TABLE 4

TABLE 4

FINAL SOLUTION ANALYSIS

| | Element | | | | | | |
|---|---|---|---|---|---|---|---|
| | $Cu_{(g/l)}$ | $FeT_{(g/l)}$ | $Fe+2_{(g/l)}$ | $Ac_{(g/l)}$ | $Cl_{(g/l)}$ | $Al_{(mg/l)}$ | $Mn_{(mg/l)}$ |
| Concentration | 6.15 | 0.56 | 0.34 | 4.4 | 21.1 | 13.6 | 0.7 |

| | Element | | | | | | | |
|---|---|---|---|---|---|---|---|---|
| | $Ca_{(g/l)}$ | $Mg_{(g/l)}$ | $Si_{(mg/l)}$ | $Na_{(g/l)}$ | $K_{(g/l)}$ | $SO_{4(g/l)}$ | pH | mV | $density_{(g/cc)}$ |
| Concentration | 0.92 | 1.35 | 1.8 | 11.0 | 0.50 | 9.41 | 0.84 | 768 | 1.042 |

As can be seen, the analysis of Cl, Na, Mg, and K are practically the same as the respective sea water analysis. That is, the concentrate has contributed only some Al, some Fe, and some silicon. Both the acid and the ion sulfate are contributed by the acid used during the wash.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A process to prepare a colloidal mass containing soluble copper salts, said copper salts obtained from the reaction of dry copper concentrate in a solution, to be washed in order to recover the copper in said solution, said dry copper concentrate comprising at least one mineralogical species containing iron, said process employing intermediate solutions, said intermediate solutions being any solution which is recirculated within said process for washing or diluting the copper concentrate, said process comprising the steps of:

simultaneously mixing the copper concentrate with water, sodium chloride, and a solution of calcium chloride in water, by a mixing equipment, to form a homogeneous suspension, said copper concentrate including iron in the form of soluble iron having a concentration of 17%, wherein the sodium contained in said water, said sodium chloride and said solution of calcium chloride comprises a total amount of sodium;
  once the homogeneous suspension is formed, adding a liquid containing sulfate ions to said suspension in a continuous flow and at a speed preventing splashing, without stopping the stirring; wherein
  the proportions of:
  total water, said total water including the water added, plus water contained in said calcium chloride, plus water contained in said copper concentrate as wetness;
  total chorine, said total chlorine including the chlorine contained in said water, plus the chlorine contained in said calcium chloride solution, plus the chlorine contained in said sodium chloride, and
  the liquid containing sulfate ions added and being contained in a polygon of the ternary $H_2O$, $Cl^-$, $H^+$ system; said polygon being limited by the following four apexes, each of said four apexes comprising an element: (a) water: 60%, chlorine: 10%, liquid containing sulfate ions 30%, (b) water: 40%, chlorine: 10%, liquid containing sulfate ions: 50%, (c) water 25%, chlorine 40%, liquid containing sulfate ions: 35% and (d) water: 40%, chlorine: 40%, liquid containing sulfate ions: 20%, wherein the percentages are in weight of the respective element;
  wherein the total amount of sodium to be added, said total sodium including the sodium as contained in said water which is mixed with said copper concentrate, plus the sodium contained in said sodium chloride, plus the sodium contained in said calcium chloride solution, is at least equal to the 17% of said iron as contained in the copper concentrate in the form of soluble iron, plus the iron contained in the mineralogical species; said process further comprising the steps of:
    adding finely ground calcium carbonate to the homogenous suspension with the added liquid containing sulfate ions in a proportion of 0 to 6 in weight of the dry copper concentrate to be treated to form the colloidal mass;
    depositing said colloidal mass in a container;
    settling sais colloidal mass in said container for a time period in the range Of 5-60 days; and
    washing said colloidal mass deposited in the container with washing solution having a solution flow of 20 to 200 liters per square meter per hour for a time period in the range of 5 and 50 days.

2. The process according to claim 1 wherein said liquid containing sulfate ions are sulfuric acid.

3. The process according to claim 1 wherein said mixing equipment for mixing said copper concentrate comprises equipment having a high torque and is selected from the group of equipment consisting of equipment used in the food industry and equipment used in the cement industry.

4. The process according to claim 1 wherein said water which is mixed with said copper concentrate is selected from the group consisting of pure water, industrial water, treated sewage water, sea water and saline water.

5. The process according to claim 1 wherein the aqueous solution containing calcium chloride is formed with water selected from the group consisting of pure water, industrial water, treated sewage water, sea water and saline water.

6. The process according to claim 1, wherein the liquid containing sulfate ions is a solution containing sulfate ions and a mineral acid supplying $H^+$ ions.

7. The process according to claim 1, wherein said at least one mineralogical species is selected from the group consisting of chalcosite, digenite, coveline, bornite, chalcopyrite, and enargite.

8. The process according to claim 1, wherein the copper concentrate is selected from the group consisting of a copper second washing, a copper precipitate and any dusty material containing copper values.

9. The process according to claim 1, wherein the washing solution is selected from the group consisting of pure water, industrial water, treated sewage water, sea water, saline water and raffinate solution of solvent extraction.

10. The process according to claim 1, wherein the washing solution contains between 0.5 and 10 (g/l) of copper, 50 and 120 (g/l) of chlorine, and 5 to 25 (g/l) of equivalent sulfuric acidity.

11. The process according to claim 1, wherein the washing solution is formed from the intermediate solutions of the process.

12. The process according to claim 1, wherein the washing solution contains chlorine, and at least part of the chorine in the washing solution is contributed by the calcium chloride used during the process to prepare the colloidal mass.

13. The process according to claim 1 and further comprising the step of drying said colloidal mass to form a residue comprising an elemental sulfur.

14. The process according to claim 13 and further comprising the step of irrigating said residue with a solvent to extract the elemental sulfur, said irrigating step occurring after washing and drying of said colloidal mass.

15. The process according to claim 14 wherein said solvent is perchioroethylene.

16. The process according to claim 14 and further comprising the step of evaporating said residue to precipitate the elemental sulfur in the form of crystals following the ending of said irrigating step.

17. The process according to claim 16 and further comprising the step of condensing and recovering said solvent, once said solvent has evaporated, for reuse.

18. The process according to claim 14 further comprising the step of treating said residue following said irrigation step, to obtain gold and silver.

* * * * *